(12) United States Patent
Kim

(10) Patent No.: US 7,702,160 B2
(45) Date of Patent: Apr. 20, 2010

(54) TRANSFERRING SYSTEM FOR HUGE AND HIGH QUALITY IMAGES ON NETWORK AND METHOD THEREOF

(75) Inventor: Sung-Min Kim, Seoul (KR)

(73) Assignee: Innotive Corporation and National Computerization Agency, Seoul (KR)

( * ) Notice: Subject to any disclaimer, the term of this patent is extended or adjusted under 35 U.S.C. 154(b) by 1311 days.

(21) Appl. No.: 10/345,430

(22) Filed: Jan. 14, 2003

(65) Prior Publication Data

US 2003/0221017 A1    Nov. 27, 2003

(30) Foreign Application Priority Data

May 21, 2002    (KR)    ................................ 2002-28241

(51) Int. Cl.
  *G06K 9/36*    (2006.01)
  *G06F 7/00*    (2006.01)
  *G06F 15/16*    (2006.01)

(52) U.S. Cl. ........................ 382/232; 382/305; 709/247; 707/1

(58) Field of Classification Search .................. None
  See application file for complete search history.

(56) References Cited

U.S. PATENT DOCUMENTS

| | | | | |
|---|---|---|---|---|
| 4,972,319 | A | * | 11/1990 | Delorme ...................... 340/990 |
| 5,510,838 | A | | 4/1996 | Yomdin et al. ............... 348/384 |
| 5,521,717 | A | | 5/1996 | Maeda ......................... 358/426 |
| 5,521,990 | A | | 5/1996 | Ishizawa |
| 5,815,148 | A | * | 9/1998 | Tanaka ........................ 715/746 |
| 6,204,879 | B1 | * | 3/2001 | Koseki et al. ............. 348/230.1 |
| 6,272,235 | B1 | * | 8/2001 | Bacus et al. ................. 382/133 |
| 6,278,432 | B1 | * | 8/2001 | Ratnakar ...................... 715/748 |
| 6,282,314 | B1 | | 8/2001 | Sugiura |
| 6,556,713 | B2 | * | 4/2003 | Kobayashi et al. ........... 382/224 |
| 6,721,952 | B1 | * | 4/2004 | Guedalia et al. .............. 725/38 |

FOREIGN PATENT DOCUMENTS

| | | | |
|---|---|---|---|
| JP | 2001-344556 | | 12/2001 |
| JP | 2001-350774 | | 12/2001 |
| KR | 1020010000208 A | | 1/2001 |
| KR | 1020020007945 A | | 1/2002 |
| WO | WO 02/61607 | * | 1/2002 |

OTHER PUBLICATIONS

Office Action dated Dec. 19, 2006, issued in corresponding Canadian Application No. 2,433,175.
Japanese Office Action dated Mar. 6, 2007.
Canadian Office Action dated Mar. 23, 2009.

* cited by examiner

*Primary Examiner*—Charles Kim
(74) *Attorney, Agent, or Firm*—Ked & Associates, LLP

(57) ABSTRACT

A transferring system for huge and high quality images on network and a method thereof are disclosed, wherein various individual image data are converted into high quality image data to be converted into layered image data, and classified into a plurality of sub cells, then stored in database as a compressed form. A client system connected to a server requires information, immediately downloads the required information, releases the compression, and then displays on a screen real time. In the present invention, a user can fast see only his wanted part since images of a newspaper and a magazine are converted as they were. Also, various additional information is provided with image, thereby providing multimedia digital publication services on wire or wireless network.

32 Claims, 8 Drawing Sheets

TRANSFERRING SYSTEM FOR HUGE AND HIGH QUALITY IMAGES ON NETWORK AND METHOD THEREOF

BACKGROUND OF THE INVENTION

1. Field of the Invention

The present invention relates to a transferring system, and particularly, to a transferring system of huge and high quality images on network and a method thereof.

2. Description of the Background Art

Nowadays, it takes much time to display high quality image data in a client computer through Internet service because of a limitation of network bandwidth or processing time in a main memory unit. That requires expansion of the network bandwidth and increased capacity of a main memory unit, resulting in increasing cost of an overall system.

In the related art, newspaper and magazine service through Internet is performed mainly with text or PDF format. The text service provides information with only letters, thereby having a limitation in added image information and various contents construction. Also, in PDF form, a file is downloaded according to a corresponding page on Internet and data are read by using a special program.

In the related art, even if the method is used by some newspaper and magazine service, a user has to download his wanted page each time and can see the part after completing the download, thereby not providing overall contents real time. Also, a constitution and a user interface of the downloaded page are not intuitive, and in case of PDF, screen renewal time is influenced by a function of the user's computer system, resulting in that the method is not proper to real time service of high quality image data.

SUMMARY OF THE INVENTION

Therefore, an object of the present invention is to provide a transferring system which fast transmits image information without extending network bandwidth and increasing capacity of a main memory device and displays the image information real time and a method thereof.

Especially, an object of the present invention is to provide a method in which a form of newspaper and magazine offered off-line is originally converted into high quality image data to provide real time on-line, and various multimedia contents and additional information are connected to be utilized as a synthetic information offering media.

To achieve these and other advantages and in accordance with the purpose of the present invention, as embodied and broadly described herein, there is provided a transferring system for huge and high quality image on network comprising an image converting system for converting digital information into a high quality image format, the digital information such as image information converted into a file possible to work in a computer or image information read from a scan device; an image database for storing high quality image information made in the image converting system; and a server system for transmitting image information stored in the image database on network by a request of a client system.

Also, in the present invention, there is provided a method for transferring high quality image on network comprising the steps of converting digital information into high quality image data by the following steps of: (a) converting digital information into layered data with different levels so as to output the digital information in the client system with various magnification or contraction levels; (b) converting digital information into a plurality of sub cells to provide a plurality of divided regions; and (c) compressing the divided digital information as a sub cell unit; storing the converted high quality image data in database; and transferring high quality image data from a server system by a request of a client system on network.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

A transferring system for huge and high quality images on network comprises a system for making original data be digital by a regular rule and converting the data into high quality image format; a database for storing the digital image data and managing; and a server system for transferring the data real time on network.

Figure 1:
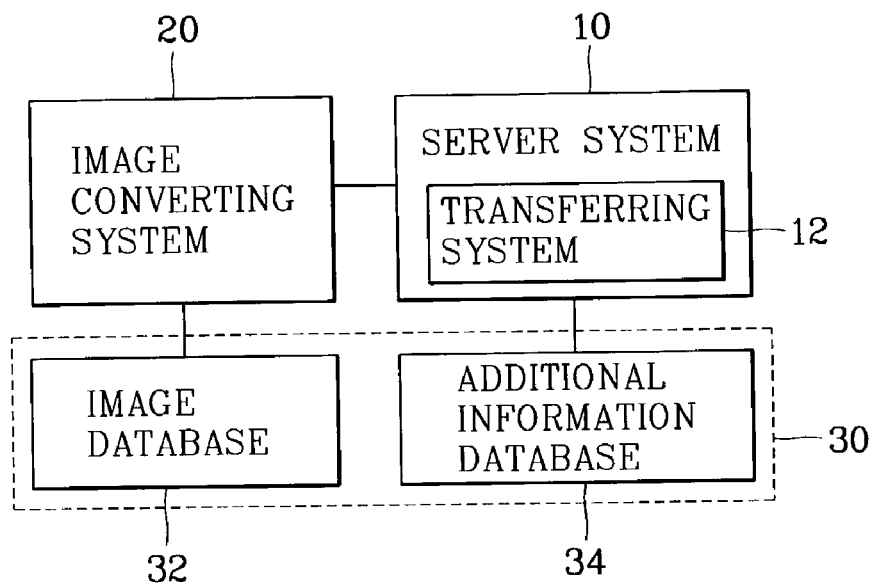
FIG. 1 is a schematic view showing a structure of a transferring system according to the present invention.

Referring to FIG. 1, a server system 10 possible to include a transferring system 12 extracts necessary information by connecting an image converting system 20 for generating high quality image data and a database 30 and then transmits the information on network. The database 30 can additionally include an image database 32 having image information and an additional information database 34 having additional information.

Figure 2:
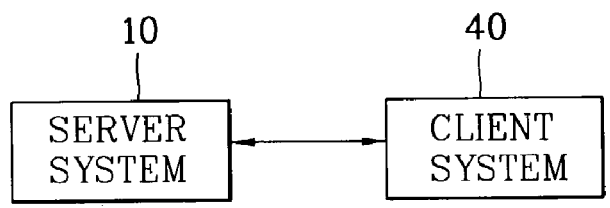
FIG. 2 is a schematic view showing communication between a server and a client according to the present invention.

In a method for transferring image data according to the present invention, as shown in FIG. 2, a server/client model is applied and then data are transmitted real time between the server system 10 and the client system 40.

With respect to a client system, one or more systems simultaneously communicate with the server system on network, and each client system includes a central processing unit and at least one memory unit and a display unit.

Figure 3A:
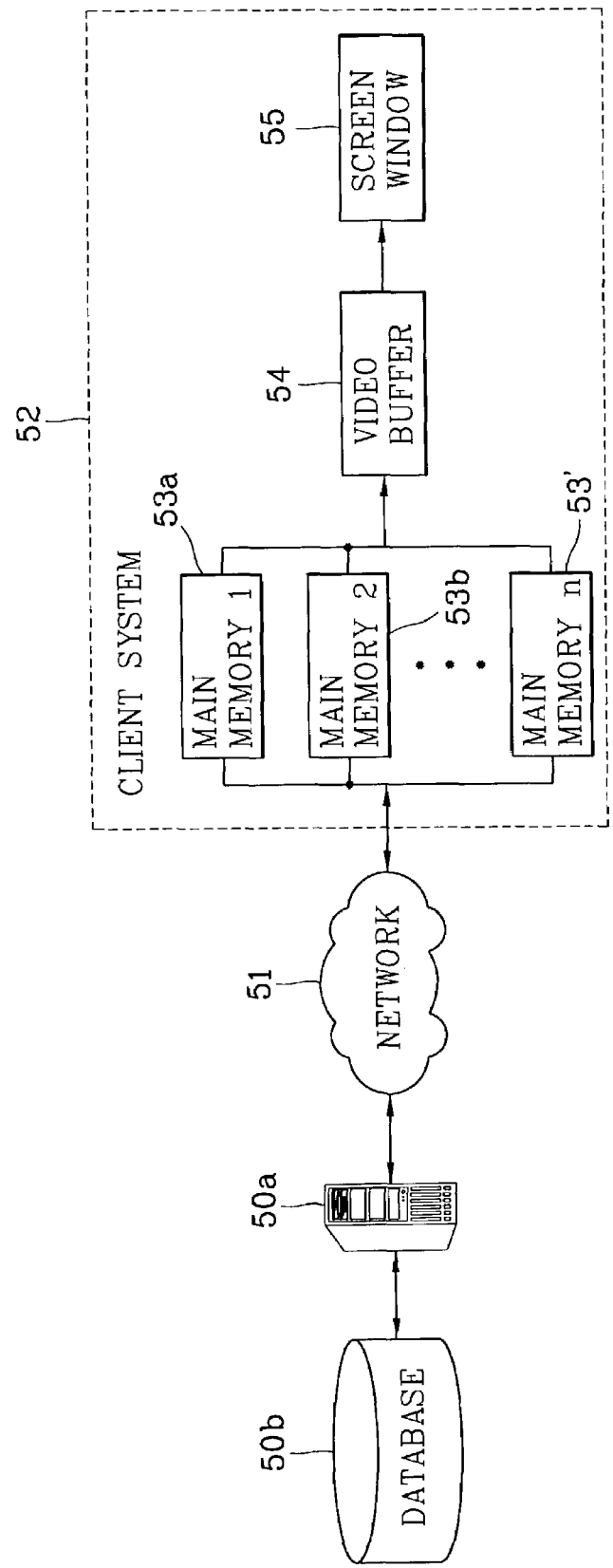
FIG. 3a is a schematic view showing an image service in accordance with the conventional art.

FIG. 3a is a schematic view showing a related art image service. Image data stored in database 50b of server 50a are transmitted to the client system through network 51 by a request of a client system, and displayed on a screen window 55 through a video buffer 54 via main memory 53a, 53b, ... 53'. At this time, since capacity of image data is much greater than another information, the main memory unit of the client system has to be large, and long transmittance time causes delay until the data are displayed on a screen window. Also, as capacity of image data is restricted by physical capacity of the main memory 53a, 53b, ... 53', there is a limit to provide huge and high quality image data real time.

Figure 3B:
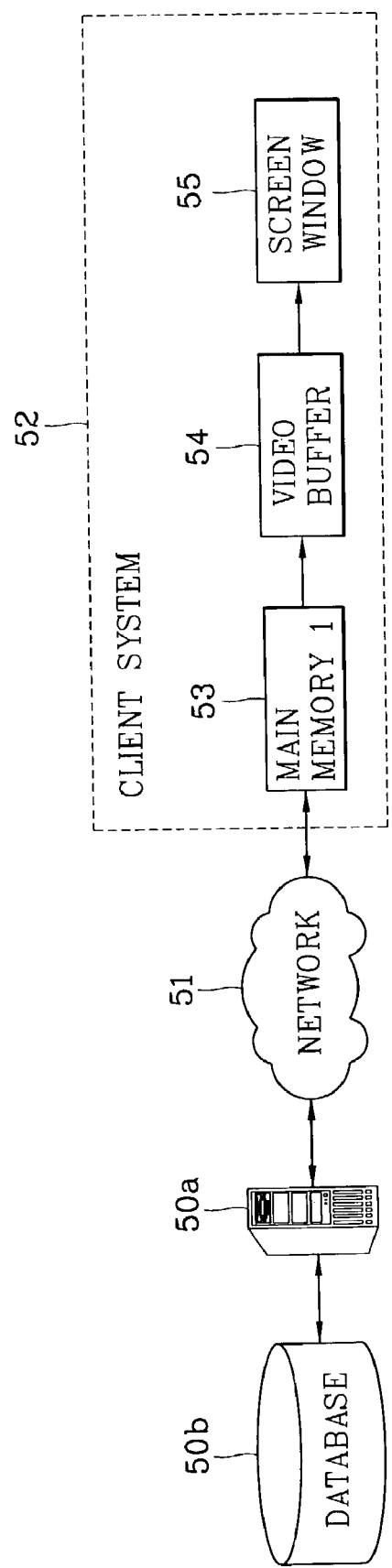
FIG. 3b is a schematic view showing an image service in accordance with the present invention.

Meanwhile, in the transferring method, as shown in FIG. 3b, high quality image data stored in the database 50b of the server 50a are compressed as a divided form and stored. The image data are transmitted to the client system 52 through the network 51 only for parts requested by a client, then compression of the image data is released in the client system real time, and displayed on the screen window 55 via the main memory unit 53 and the video buffer 54. Accordingly, in the system and method of the present invention, even if capacity of a memory in a client system is less or network bandwidth is less, information requested by a client is displayed real time.

In the present invention, network includes all means in which not only wire Internet or wireless Internet but also all kinds of intranets and at least two electronic media are connected for communication. Hereinafter, network will be explained mainly about Internet.

High Quality Image Data

High quality image data according to the present invention is a special format which fast displays huge image through network in a client system. By using the format, huge image can be fast displayed without delay of time, and fast searched. Also, approximate information is searched by contracting the huge image with layered data, and minute information is searched by magnifying the image. The magnification and contraction processes also work fast.

Digital information including huge image information is converted by image converting system of the present invention by the following main three steps.

(1) converting huge image into multiple layered data according to levels (2) dividing the huge image into a plurality of sub cells (3) compressing the image as divided cell units To convert into high quality image data, general image files such as BMP, GIF, PNG, JPG, etc. are used as original text contents. Also, a text file such as PDF is converted into an image file for use.

Figure 4:
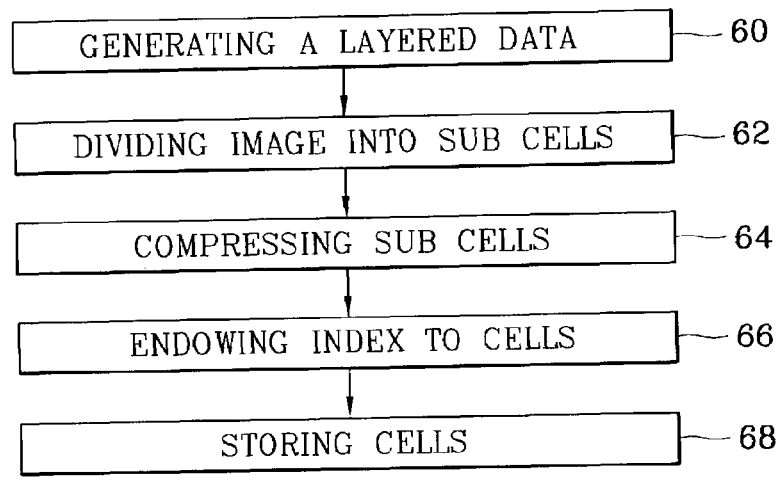
FIG. 4 is a flow chart showing generation steps of high quality image data.

Original image files are converted into high quality image data by steps shown in FIG. 4. First of all, a plurality of layers sequentially structured from an image file are generated (60). Then, the layered data are divided into a plurality of sub cells (62), and compressed as divided cell units (64). Then, each index is endowed to the compressed cells (66), and each cell is integrated to be stored in database (68). The processes will be explained in detail.

Generation of Layered Data

In the present invention, image data having a layered structure are generated so as to provide high quality image in which images of multimedia digital publication and etc. transmitted real time on network are magnified or contracted fast and accurately according to levels. That is, a plurality of data layers converted with $½^n$, ..., $¼$, $½$, 1 times, etc. of an original image are generated.

Figure 5:
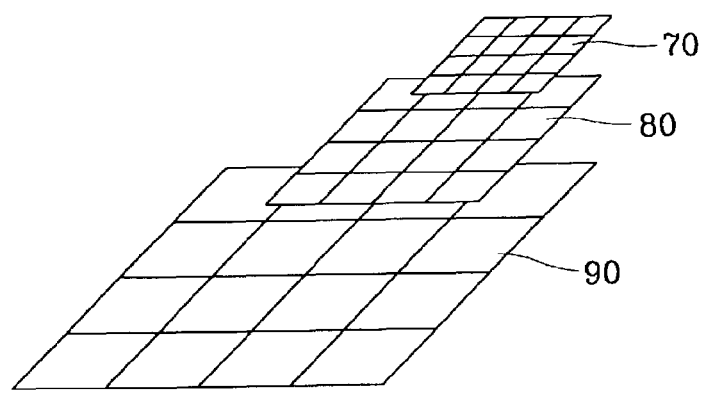
FIG. 5 is a schematic view showing layered data.

FIG. 5 is a schematic view showing layered data. As shown in FIG. 5, high quality individual images are constituted by layers according to displayed levels at the time of magnification or contraction, and respective layers 70, 80, and 90 are used in magnification or contraction steps. That is, in case of magnifying, images are displayed from upper data 70 to bottom data 90 via middle data 80. On the contrary, in case of contracting, images are displayed in reverse order. Also, it is possible to change the displayed screen discontinuously.

The number of layers in the layered structure are determined by graphic user interface (GUI). In FIG. 5, data layers of three steps are illustrated, but if graphic user interface can provide a function of magnification or contraction with four steps, image data are converted to have four layers.

Division of Huge Image

The generated data layers are divided into a plurality of sub cells. By dividing the data, huge image is fast transmitted. Division units of the huge image into a plurality of sub cells are determined by a processing ability of a client system and a transmittance speed on network. At this time, a number of sub cells are determined within an optimum scope. Indexes are endowed to each cell of the divided images, and the images are integrated by positions or orders. The integrated cells exist as one file, but only corresponding cells of the huge image are transmitted by a client's request. According to this, a client can fast see his wanted image.

Figure 6:
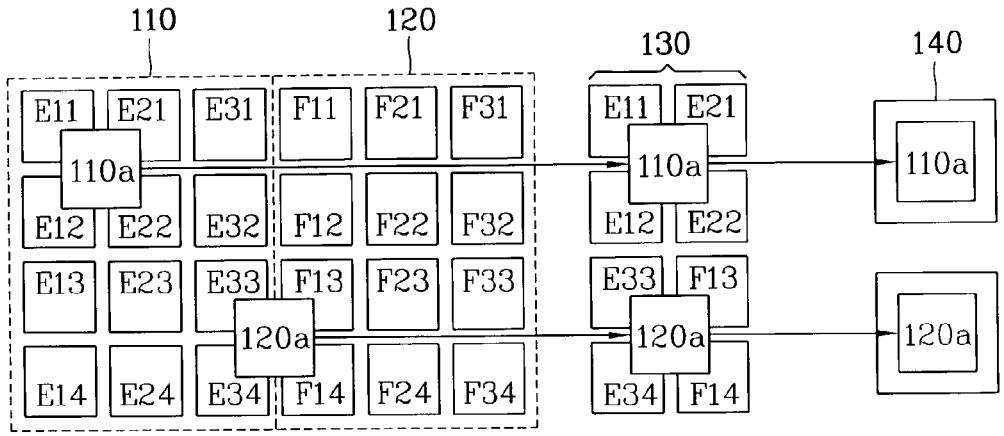
FIG. 6 is a schematic view showing a process for classifying a huge image and then transferring.

Referring to FIG. 6, a process for displaying the divided image data real time on network will be explained. Individual image data 110 and 120 stored in database consist of sub cells respectively. In Figure, Eij and Fij represent sub cells of i line and j column.

As aforementioned, dividing image data into each sub cell unit and then storing is determined by a processing ability of a client system and a transmittance speed on network. At this time, if a large number of sub cells are divided, a processing speed in a central processing unit of a client system is down, and if few sub cells are divided, a transmittance speed on network is down. Therefore, it is important to divide the sub cells within an optimum scope.

For example, supposing that screen display resolution is 1024×768 pixel, images displayed on a screen are divided into 5 horizontal sub cells and 4 vertical sub cells. The cells divided at an optimum condition prevent delay in a transmitting process or in a display process, and transmit image fast.

The divided sub cells are compressed, and endowed with indexes, so that positions and coordinates etc. in an overall image are recorded. Then, the sub cells are integrated into one file and stored in database.

Compression of the Divided Image Data

High quality image data according to the present invention are stored as a compressed form so as to improve a transmittance speed.

It is preferable to compress data into each divided sub cell unit. At this time, compression technique such as widely known JPEG, GIFE are used. Each sub cell can be compressed with a same method independently, or compressed with different methods. For example, in case of data having a figure and a picture together, GIF compression is used at the figure and JPEG compression is used at the picture. By doing so, it is possible to improve compression efficiency of an image.

The compressed sub cells are integrated according to orders and positions, and are endowed with indexes respectively, then stored in database. The indexes can include not only base information of sub cells but also additional information relevant to the sub cells. A server system is accessed to the indexes and selects sub cells of a wanted image, thereby fast transmitting.

Transmittance of the Divided Image

If the client system requests special image information (for example, click of a special item in a graphic user interface circumstance, or move of a view point), a server system selects only sub cells relevant to the client's request information in image data stored in database and transmits the sub cells to the client system.

For example, in case that a client requests special information (110a) among one individual image data 110, only relevant sub cells (E11, E21, E12, E22) are transmitted on network (130) since sub cells of the individual image data are E11, E21, E12, and E22. Also, the client system releases compression of the transmitted sub cells in a central processing unit (compression will be later explained), and displays only a displayed part 110a in a display unit through a main memory unit.

Meanwhile, in case that the client system requires information included in at least one individual image, sub cells are transmitted by the following method. In FIG. 6, if the client requests another special part 120a, the server system transmits sub cells relevant to the part 120a among the two individual image data 110 and 120 to the client system, the sub cells, E33 and E34 included in the first image data 110 and F13 and F14 included in the second image data 120. The client system releases compressions of the transmitted sub cells in a central processing unit, and displays only displayed part 120a in a display unit through a main memory unit (140).

Once individual image data are divided into sub cells and only requested cells by a client among the divided sub cells are transmitted, huge image can be fast transmitted and displayed, even if capacity of a main memory unit in the client system is less, a processing ability of a main processing unit is less, or data transmitting speed on network is low (that is, bandwidth of transmittance line path on network is less).

Client/server Model

High quality image data generated from the image converting system can be displayed with just less memory and less calculation of a main processing unit when a client system receives an image file. The reason is why only required parts among sub cells divided from huge image data are selected, transmitted, and displayed. The larger original text image size (information amount) is and the more the number of layers is, the more advantage is obtained.

The present inventors applied the advantage to the client/server model in which network such as Internet line is used and developed a powerful image providing solution. Accordingly, in the present invention, at best utilized is display ability of a client system having limitation in transmitting data on network (that is, bandwidth), storing for the transmitted data, and processing the data, thereby providing huge image real time.

A server system is connected to image database for storing high quality image data and additional information database for storing additional information, thereby providing information requested by a client system real time. Like the transferring system 12 in FIG. 1, the server system can include an independent system for selecting required information from database and transmitting to the client system at an inner side and can include database together. On the other hand, image database and additional information database can be constituted as additional database or exist in another system.

A client system includes a central processing unit, a memory unit, a display unit, and a browser for connecting to each server through network. Once the client system is connected to the server for transferring high quality image data according to the present invention on network, the client system automatically receives a client program for processing the high quality image data.

Figure 7:
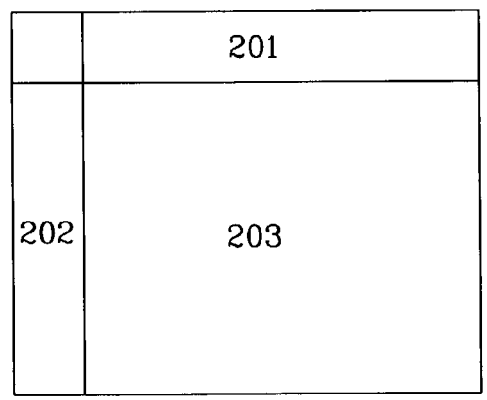
FIG. 7 is a schematic view showing one embodiment of a graphic user interface.

The client program provides various graphic user interfaces, fast receives various contents provided from the server, and displays in the client system. FIG. 7 is a schematic view showing one embodiment of a graphic user interface. In FIG. 7, a graphic user interface consists of a function button region 201, a section menu and search region 202, and an image display region 203. The user interface can have various constructions and forms according to kinds of transmitted image data and user's convenience.

High quality image data according to the present invention are applied to the client/server model, so that huge image information is transmitted on network fast and efficiently and displayed in the client system.

In the present invention, contrary to the related PDF service and JPEG image providing solution where an overall image file is transmitted, only a request part by a client system is transmitted and displayed real time, thereby having a more excellent performance. Also, since images are fast magnified or contracted according to levels by a layered data structure, an efficient search of image information is possible. That is, it is possible to transmit, display and search image information real time by image streaming.

In each index of high quality image data, not only information regarding to sub cells but also additional information are recorded. The additional information includes moving image, text, sound, web page information regarding to each sub cell. Therefore, if the server system transmits the additional information to the client system with the image data, a user of the client system can receive information of the moving picture, text, web page, etc, together with image.

Information Request by a Client

It is general for an Internet user to search image by moving a view point shown on a screen of a display unit such as a monitor of a client system. Image information requested by a client system exists in a server system, so that the client system has to request transmittance of corresponding information to the server.

The process works by a series of streaming packet defined in advance, and is performed by a client program already transmitted to the transmittance system in the server system and the client system. The process will be explained in detail.

A user is connected to a server on network in a client system. To the first connected user, a client program is automatically transmitted from a server at the time of connection (to the user already connected, the client program needs not to be transmitted), and the client program makes the user search information requested by the server by providing graphic user interface in the client system.

The user requests image information and image level change in the interface provided by the client program. The process is shown as a click for items and icon on the interface displayed on a screen.

By the process, a request by the client system is transmitted to the server on network. The server receives the request and searches sub cells corresponding to a part requested by the client system, then transmits one by one real time.

In the client system, compressions of sub cells (image tile) transmitted from the server are released real time in a central processing unit, and the sub cells are displayed on a screen via a main memory unit and a video buffer. Accordingly, a screen is immediately displayed without delay of image processing in the client system.

If the user moves a view point to a new region on interface of a monitor screen or changes an image level, the client program transmits information request for the new image region or image of different level to the server.

Figure 8:
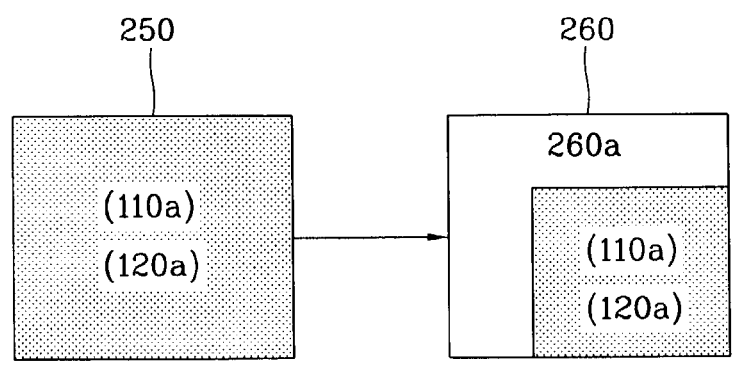
FIG. 8 is a schematic view showing that a screen is renewed by transmitting image information in the present invention.

FIG. 8 is a schematic view showing that a screen is renewed by transmitting image information according to the present invention. If display data 110a and 120a transmitted from database of the server are displayed on a screen 250 and the screen is moved (260), image data for a new region 260a are transmitted from the database of the server and integrated with the original display data 110a or 120a in the client system. The integrated data constitute a new integrated image (260a and 110a or 260a and 120a) and are displayed on a screen window. Accordingly, screen change is not delayed or discontinuous, rather a continuous display like moving image is possible.

Providing Additional Information

In a state that the server selects image data from database according to a request of the client system, if additional information is included on index, the additional information is transmitted to the client system with image data.

The additional information is stored in additional information database of the server. In the database, a location (that is, image data which will be displayed with the additional information), kinds, and styles of the additional information (for example, in case of text information, color, font, and in case of moving image information, image path) are stored. The additional information can be generated through a separate tool and can be input by a hand work.

It is preferable to manage the additional information provided with high quality image according to the present invention through a separate file. The file is defined as MAP file in the present invention. The additional information management file consists of a script language, and contains a position and an attribute of the additional information on the basis of resolution of high quality image.

For example, in case of providing moving image of Abc.mpg in 500×500 position of 1000×1000 high quality image, if an image file name is Abc.IPQ, Abc.MAP having the same file name are generated and defined as follows.

Movie 500, 500 Abc.mpg

The additional information file (Abc.mpg) and the management file (Abc.MAP) are stored in additional information database. If image information requested by the client is Abc.IPQ, the server connects the image information with Abc, MAP and transmits to the client system with Abc.mpg.

Preferred Embodiments

Hereinafter, real time service of multimedia digital publication will be explained in detail.

Figure 9:
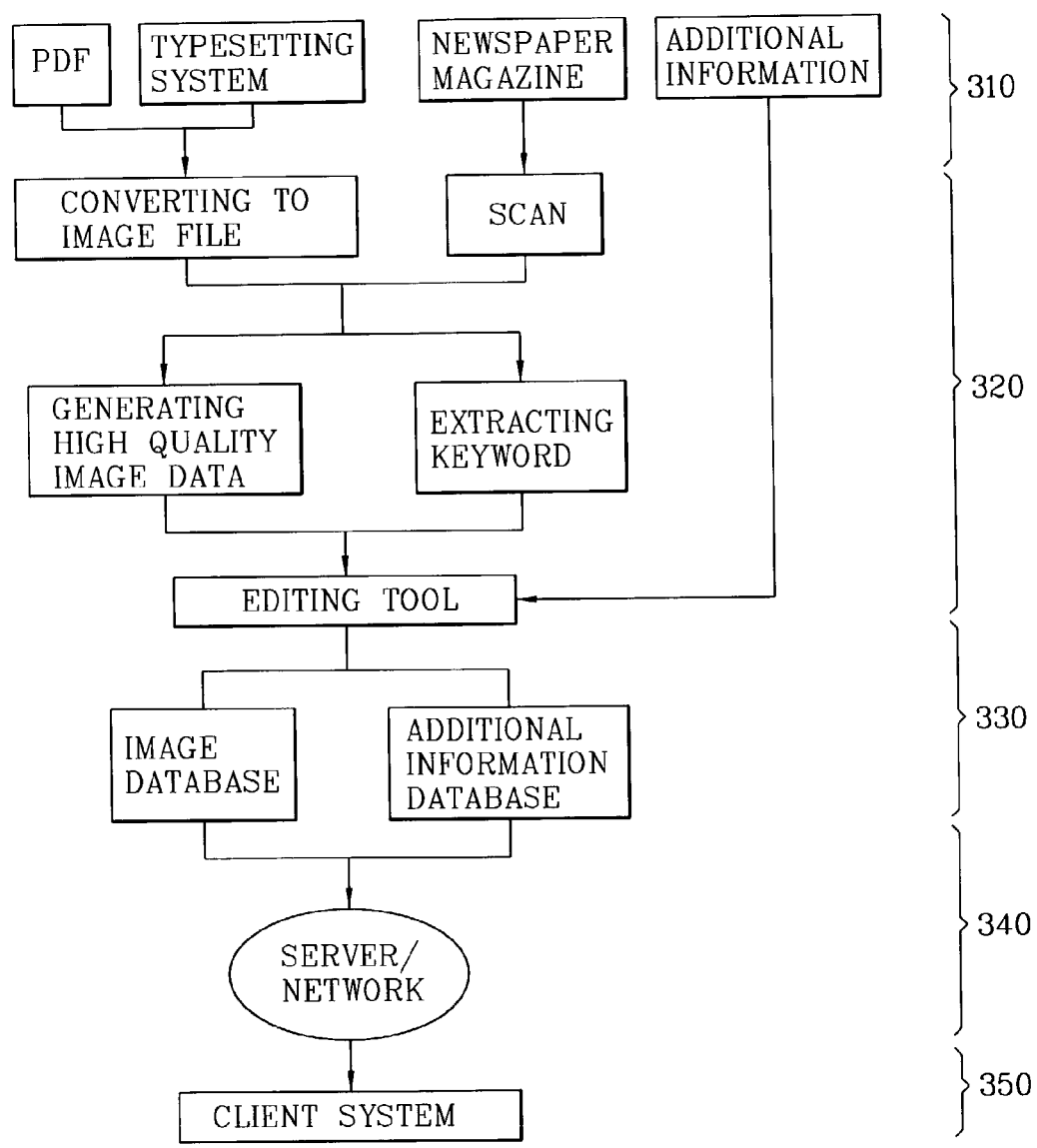
FIG. 9 is a flow chart showing a real time service process of a multimedia digital publication in the present invention.

FIG. 9 is a flow chart showing a real time service process of a multimedia digital publication according to the present invention.

In a data collecting step (310), individual image data and additional information data which will be constituted as real time integrated data are collected. The individual image data are generally interactive one another. Examples of the individual data include data which scanned each side of a newspaper, data which scanned each side of a magazine, image data converted in PDF file, and image data directly converted from typesetting system, etc. Also, the additional information data which will be used in the step includes moving image file, sound file, another image file, text information, and web page address, etc.

A manufacturing step (320) is a step for converting data collected in the data collecting step into individual high quality image data and for connecting with additional information data.

A file converted from PDF and from typesetting system is converted to high quality image file according to the present invention, and a newspaper and a magazine are scanned to be manufactured as an image file, thereby generating high quality image. In the step, methods such as the aforementioned data layer generation, image division, and compression, etc. are used.

Also, in the step, a search keyword necessary to an image search is extracted. The keyword can be a theme word regarding a headline in case of a newspaper. Then, determined is whether individual image, search keyword, and additional information collected in the data collecting step 310 are interactive one another or not. In the case, the additional information can be edit by hand work or another tool (editing tool), or data relevant one another are connected to be integrated.

Then, respective data are stored in high quality image database and additional information database (330).

In a transmitting step (340), at the time of transmitting information according to a request of a client on Internet network, only data display region 110a or 120a are transmitted.

In a displaying step (350), the transmitted data display region is displayed on a screen window via a central processing unit, a main memory unit, a video buffer, etc. in the client system.

As shown in FIG. 9, the server reads data stored in database when the client requests individual image and additional information and transmits the data to the client through Internet. At this time, in case that image data requested by a client are on several individual images, corresponding data (that is, each sub cell) are transmitted real time, and integrated in the client system to constitute as one image. The additional information selects corresponding information in additional information database and transmits with image data real time as a streaming form.

Figure 10:
FIG. 10 is a screen capture showing an embodiment of GUI of a digital newspaper according to the present invention.

FIG. 10 is a screen capture showing an embodiment of GUI of a digital newspaper according to the present invention.

A function button region (corresponding to 201 of FIG. 7) includes a tool for selecting a newspaper according to kinds, a tool for selecting a page of the selected newspaper, a tool for selecting a part of displayed digital newspaper, a tool for displaying the selected region, and a clipping function for storing the selected region or individual image as another file.

In section menu and searching region (202 in FIG. 7), contents of a newspaper are classified into an entire headline, politics, economy, society, culture, international, sports, entertainment, region, and serials, etc., and corresponding individual image information is included. The searching region consists of a part for inputting a search keyword and a part for displaying a search result. The search result is displayed at a bottom of the section menu as a list form.

In image display region (203 of FIG. 7), selected individual image and real time integrated image are displayed.

High quality newspaper or magazine image transmitted from the database of the server can be displayed with various methods besides the methods shown in the preferred embodiments.

Meanwhile, if a user moves a view point along displayed images by using a mouse, only renewed region is transmitted from the server and displayed. Even if the user moves high quality digital image to any directions, image data of the new region are transmitted real time without delay in a transmitting process and displayed on a screen. Also, if the user clicks a wanted part with a mouse, the part can automatically move to a center of a screen.

Image magnification or contraction function is performed by locating a mouse cursor to a wanted part and clicking. The magnification or contraction can be performed by a layer unit step by step, or can be performed at one time from the highest step (70 of FIG. 5) to the lowest step (90 of FIG. 5). At this time, the renewed data are displayed by the same method shown in FIG. 8. In case of magnifying or contracting image, various effects can be simultaneously realized by using contents such as sound, image, text, and flash animation, etc.

Figure 11:
FIG. 11 a screen capture showing an embodiment of GUI of a digital magazine according to the present invention.

In case that hyper-linked additional information exists at a special position of image displayed from a display unit of the client system, the corresponding information is displayed on a screen real time. At this time, the additional information can be displayed on a current window, or on a new window. Additional information data that will be used with high quality image includes moving image file, sound file, flash animation, another high quality image file, text information, and web page address, etc. FIG. 11 shows a real time service of a magazine corresponding to one of multimedia publications. Alike the aforementioned embodiments, various additional information can be provided with high quality image data. Also, in case that another image is requested besides the information shown on a screen, a screen is renewed real time and displayed in the client system.

According to the present invention, high quality image data are provided real time without extending network bandwidth and increasing capacity of a main memory device. Especially, huge image information is provided as high quality image data without extending a client system and delaying time.

Also, in the present invention, possible is real time service of high picture quality multimedia digital publication, and image data and relevant additional information data are provided through a graphic user interface, so that a user can easily obtain various information. Also, wanted information is fast searched, and same resolution is maintained at the time of magnifying a screen. A real time service of high picture quality multimedia digital publication can be applied to all publications issued periodically, so that various on-line services are possible.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A system for transferring image information on a network comprising:
    a server system for transmitting the image information stored in an image database connected to the network according to a request of a client system, the server system comprising:
    an image converting system for converting digital information into an image format; and
    an image database for storing image information made in the image converting system,
    wherein the image converting system converts the digital information into layered image information data with different magnification or contraction levels,
    wherein the image converting system further divides the digital information into a plurality of sub cells to provide a plurality of divided regions and compresses the divided digital information into each sub cell unit, and
    wherein the image converting system compresses the divided digital information into each sub cell unit, and each of the compressed cells is endowed with an index and integrated according to its order or position, thereby constituting one image file; and
    wherein in accordance with a request from the client system, the server system steams a portion of the indexed divided digital information to the client system in real time so that a requested portion of the image information is displayed on the client system;
    wherein at the time of when the digital information is divided into a plurality of sub cells, a number of the divided sub cells is determined by information regarding the client system information processing capacity and transmission speeds of the network; and wherein the compression of a cell unit is performed by a plurality of different methods, each method corresponding to each cell.

2. The system of claim 1, wherein the digital information consists of at least one image information, and each image information is independently converted into layered data, divided into sub cells to be compressed, and integrated according to its order or position in the digital information file, an integrated whole of the sub cells thereby constituting one image information file.

3. The system of claim 1, wherein the image converting system connects the converted image information with a relevant search term and then stores the search term in a related additional information database.

4. The system of claim 1, wherein the image database consists of the image database and an additional information database.

5. The system of claim 4, wherein at least one of a moving image file, sound file, text file, and multimedia file are stored in the additional information database.

6. The system of claim 4, wherein the additional information database includes an additional information file and a management file, the management file connects the additional information and corresponding image information.

7. The system of claim 1, wherein the server system includes a transferring system for transmitting digital information according to a request of the client system.

8. The system of claim 7, wherein the transferring system transmits only sub cells of a part corresponding to data requested by a client among digital information.

9. The system of claim 7, wherein the transferring system connects the image database and additional information database and transmits image information and relevant additional information to the client system.

10. A method for transferring images on network comprising the steps of: converting digital information into image data in a server system by the following steps of:
   a) converting digital information into layered data with different levels so as to display the digital information in a client system with various magnification or contraction levels;
   b) converting the digital information into a plurality of sub cells to provide a plurality of divided regions;
   c) compressing the divided digital information as a sub cell unit storing the converted image data in an image database; and transferring the stored image data via the server system according to a request of the client system on a network,
   wherein each of the compressed sub cells is endowed with index and integrated according to its order and/or position in the digital information, thereby constituting one image information file; and
   d) streaming via the network and server system a portion of the indexed divided digital information to the client system in real time in accordance with a request from the client system, so that the requested portion of the image information is displayed on the client system;
   wherein at the time of when the digital information is divided into a plurality of sub cells, a number of the divided sub cells is determined by information regarding the client system information processing capacity and transmission speeds of the network; and wherein the compression of a cell unit is performed by a plurality of different methods, each method corresponding to each cell.

11. The method of claim 10, wherein if a client is connected to a server on network, the server system automatically transmits a client program capable of processing the image data.

12. The method of claim 10, wherein the server system transmits only sub cells of a part corresponding to data requested by the client system.

13. The method of claim 10, wherein the image data are stored with additional information.

14. The method of claim 13, wherein the image data are stored in the image database, and the additional information is stored in the additional information database.

15. The method of claim 14, wherein the server system connects the image database and the additional information database according to a request of the client system and transmits image information and related additional information to the client system.

16. The method of claim 10, wherein the server system accessing the image database, transmits image data having a level among the layered data corresponding to a request of the client system.

17. A method for transferring images on network comprising the steps of:
   converting at least one individual image data into digital image data in a server; converting the digital information into image data by the following steps of:
      a) converting digital information into layered data with different levels regardless of whether digital information include at least one image or at least one character so as to display the digital information in a client system with various magnification or contraction levels;
      b) converting the digital information into a plurality of sub cells to provide a plurality of divided regions; and
      c) compressing the divided digital information as sub cell units storing the converted image data in the image database; and transferring the image data from the server according to a request of the client system on the network,
   wherein the image data are stored in image database, and the additional information is stored in additional information database, and the additional information database includes an additional information file and a management file, the management file connects the additional information and the corresponding image information; and
   streaming via the network and server a portion of the indexed divided digital information to the client system in real time in accordance with a request from the client system, so that the requested portion of the image information is displayed on the client system;
   wherein at the time of when the digital information is divided into a plurality of sub cells, a number of the divided sub cells is determined by information regarding the client system information processing capacity and transmission speeds of the network; and wherein the compression of a cell unit is performed by a plurality of different methods, each method corresponding to each cell.

18. The method of claim 17, wherein scanned newspapers and magazine pages create image data that is converted into digital image information in the server.

19. The method of claim 17, wherein if a client is connected to a server on network, the server automatically transmits a client program including graphic user interface for searching and processing the image data.

20. The method of claim 17, wherein the server system transmits only sub cells of a part corresponding to data requested by the client system.

21. The method of claim 17, wherein the image data are stored with related additional information.

22. The method of claim 21, wherein the management file includes kinds and connection positions of the additional information regarding the image data.

23. The method of claim 22, wherein the additional information includes at least one selected from moving image, sound, text, individual image data, flash animation, and web page address.

24. The method of claim 17, wherein the server system via the image database, transmits data having a level corresponding to the request among layered data according to a request of the client system.

25. The method of claim 24, wherein the layered data are transmitted step by step or directly transmitted from the highest level to the lowest level.

26. The method of claim 24, wherein the additional information is transmitted with layered data so as to obtain various effects at the time of magnifying or contracting a screen in the client system.

27. The method of claim 17, wherein the server transmits only sub cells corresponding to a part requested by the client system among a plurality of individual image data converted into high quality image data, and the client system a) releases compression of the transmitted sub cells real time b) integrates the compressed sub cells into one image real time c) displays the integrated image real time through a screen window of graphic user interface of a client program.

28. The method of claim 27, wherein the graphic user interface includes a function button region, a section menu region, a search function region, and an image display region.

29. The method of claim 28, wherein the function button region includes an item for selecting a newspaper or a magazine, an item for selecting a page of the selected publication, an item for selecting a part of displayed images, an item for displaying the selected region, and an item including a clipping function for storing the selected region or an individual image into additional file.

30. The method of claim 28, wherein the section menu region includes a region for arranging menus according to a classification of the image, and the search function region includes a region for inputting a search key word and a region for displaying a search result.

31. The method of claim 30, wherein the search result is displayed at a bottom of a section menu as a list form.

32. The method of claim 28, wherein the selected individual image and the real time integrated image are displayed in the image display region, the displayed image can be magnified, contracted, or moved, and if additional information exists, the additional information is displayed by an user's selection.

* * * * *